(12) United States Patent
Van Haaster et al.

(10) Patent No.: US 12,466,668 B2
(45) Date of Patent: Nov. 11, 2025

(54) SORTING DEVICE

(71) Applicant: TriNovate B.V., 's-Graveland (NL)

(72) Inventors: Patrick Theodorus Johannes Van Haaster, De Zilk (NL); Nicolaas Pieter Schilder, Warmenhuizen (NL)

(73) Assignee: TriNovate B.V., 's-Graveland (NL)

( * ) Notice: Subject to any disclaimer, the term of this patent is extended or adjusted under 35 U.S.C. 154(b) by 193 days.

(21) Appl. No.: 18/260,205

(22) PCT Filed: Feb. 8, 2022

(86) PCT No.: PCT/EP2022/052959
§ 371 (c)(1),
(2) Date: Jun. 30, 2023

(87) PCT Pub. No.: WO2022/171599
PCT Pub. Date: Aug. 18, 2022

(65) Prior Publication Data
US 2024/0067466 A1    Feb. 29, 2024

(30) Foreign Application Priority Data
Feb. 11, 2021    (EP) .................................... 21156589

(51) Int. Cl.
*B65G 47/24*    (2006.01)
*B65G 47/44*    (2006.01)
*B65G 47/96*    (2006.01)

(52) U.S. Cl.
CPC ............. *B65G 47/96* (2013.01); *B65G 47/44* (2013.01)

(58) Field of Classification Search
CPC ......... B65G 47/24; B65G 47/44; B65G 47/96
(Continued)

(56) References Cited

U.S. PATENT DOCUMENTS 5,664,660 A * 9/1997 Prydtz .................. B65G 47/962
                                                198/370.03
6,015,039 A * 1/2000 Bonnet .................. B65G 47/78
                                                198/370.09
(Continued)

FOREIGN PATENT DOCUMENTS

CN    107983660 A    5/2018
EP      1561714 A1    8/2005
(Continued)

OTHER PUBLICATIONS

International Search Report and Written Opinion for corresponding International application No. PCT/EP2022/052959; dated May 25, 2022 (13 pages).

*Primary Examiner* — Douglas A Hess
(74) *Attorney, Agent, or Firm* — MENDELSOHN DUNLEAVY P.C.; Kevin J. Dunleavy

(57) ABSTRACT

A sorting device (1) comprises a conveyor (3) for supporting and transporting products in a direction of conveyance (X), a discharging system (10, 13) for selectively discharging products from the conveyor (3) at predefined locations (A) in the direction of conveyance (X) and a plurality of receiving units (2) including respective inlets (6) for receiving discharged products from the conveyor (3). The inlets (6) are arranged behind each other parallel to the conveyor (3) at a distance of the conveyor (3) and each of the inlets (6) has an upstream edge (7) and a downstream edge (8) which lies at a distance from the upstream edge (7) in the direction of conveyance (X). The sorting device (1) is provided with displaceable guides (12, 12', 14, 14') which cooperate with the discharging system (10, 13) and at least one of the upstream edges (7) and the downstream edges (8) of the inlets (6) of the respective receiving units (2). Each guide (12, 12', 14, 14') has a first position (12, 14) for guiding a discharged product to the inlet (2) of a selected receiving (Continued)

unit (2) in which first position (12, 14) it is located between the conveyor (3) and the inlet (6) of the selected receiving unit (2) at said at least one of the upstream edge (7) and the downstream edge (8) thereof, and a second position (12', 14') for providing a free passage for a discharged product to another inlet which is located adjacent to said at least one of the upstream edge (7) and the downstream edge (8).

20 Claims, 4 Drawing Sheets

(58) Field of Classification Search
USPC ....... 198/370.01, 370.02, 370.03, 370.4, 560
See application file for complete search history.

(56) References Cited

U.S. PATENT DOCUMENTS

| | | | | |
|---|---|---|---|---|
| 6,082,522 | A * | 7/2000 | Polling | B65G 47/962 198/370.04 |
| 6,435,333 | B1 * | 8/2002 | Sala | B65G 47/1457 198/383 |
| 6,564,922 | B1 * | 5/2003 | Taylor | B65G 47/766 198/360 |
| 6,762,382 | B1 * | 7/2004 | Danelski | B65G 17/002 209/912 |
| 7,374,032 | B2 * | 5/2008 | Marti Mercade | B65G 47/71 198/400 |
| 8,096,403 | B2 * | 1/2012 | Marti Sala | B65G 47/1457 198/384 |
| 8,245,835 | B2 * | 8/2012 | Balk | B65G 47/96 198/369.3 |
| 8,424,670 | B2 * | 4/2013 | Van Den Goor | B65G 47/844 198/370.02 |
| 8,701,865 | B2 * | 4/2014 | Forni | B65G 47/24 198/395 |
| 9,233,803 | B2 * | 1/2016 | Pilarz | B65G 17/345 |
| 10,577,194 | B2 * | 3/2020 | Stronkhorst | B65G 47/962 |
| 11,111,084 | B1 * | 9/2021 | Kalm | B65B 35/20 |
| 2020/0160011 | A1 | 5/2020 | Wagner et al. | |

FOREIGN PATENT DOCUMENTS

| | | |
|---|---|---|
| EP | 2305582 A1 | 4/2011 |
| EP | 3248914 A1 | 11/2017 |
| WO | 9523750 A1 | 9/1995 |
| WO | 2016179480 A1 | 11/2016 |

* cited by examiner

SORTING DEVICE

The present invention relates to a sorting device, comprising a conveyor for supporting and transporting products in a direction of conveyance, a discharging system for selectively discharging products from the conveyor at predefined locations in the direction of conveyance, a plurality of receiving units including respective inlets for receiving discharged products from the conveyor, which inlets are arranged behind each other parallel to the conveyor at a distance of the conveyor and each of the inlets has an upstream edge and a downstream edge which lies at a distance from the upstream edge in the direction of conveyance.

Such a sorting device is known in the prior art. The known sorting device is applied for sorting products which must be sent to different destinations. Each of the receiving units may correspond to a certain destination. In order to create a high sorting capacity the conveyor usually runs at high speed. Consequently, a product which is destined for one of the receiving units may already be discharged by the discharging system at a location upstream of the upstream edge of the inlet of the selected receiving unit. After leaving the conveyor the discharged product moves both in the direction of conveyance and in a direction perpendicular to the direction of conveyance towards the inlet of the selected receiving unit. The length of each inlet in the direction of conveyance is based on the expected paths which are followed by the respective discharged products. Increasing variation of parameters such as size, shape, weight and centre of gravity of the products, the location where products are placed on the conveyor, speed of the conveyor and speed of a product leaving the conveyor, may lead to a greater variation of the paths that are followed by the different products between the conveyor and the inlets, hence requiring larger lengths of the inlets in the direction of conveyance. This is undesired in terms of required floor space.

The present invention aims to provide a compact sorting device.

For this purpose the sorting device according to the invention is provided with displaceable guides which cooperate with the discharging system and at least one of the upstream edges and the downstream edges of the inlets of the respective receiving units, wherein each guide has a first position for guiding a discharged product to the inlet of a selected receiving unit in which first position it is located between the conveyor and the inlet of the selected receiving unit at the at least one of the upstream edge and the downstream edge thereof, and a second position for providing a free passage for a discharged product to another inlet which is located adjacent to the at least one of the upstream edge and the downstream edge.

If a product is destined for a selected receiving unit the discharging system can start a discharging action in order to discharge the product from the conveyor. At the same time it can also set the guide which cooperates with the at least one of the upstream edge and the downstream edge of the inlet of the selected receiving unit in its first position so as to guide the discharged product to the inlet of the selected receiving unit.

A product which is discharged from the conveyor at a predefined location in the direction of conveyance and leaves the conveyor relatively quickly may enter the inlet of the selected receiving unit close to the upstream edge thereof. A product for which the discharging action starts at the same location in the direction of conveyance in order to arrive at the same receiving unit, but which leaves the conveyor further downstream, for example due to being placed at a different location at the conveyor, and/or moves from the conveyor towards the inlets in a direction perpendicular to the direction of conveyance relatively slowly may tend to pass the downstream edge of the inlet and arrive at a location downstream of the downstream edge of the inlet of the selected receiving unit, for example in an adjacent inlet which lies downstream of the inlet of the selected receiving unit; if the guide in its first position is located at the downstream edge of the inlet of the selected receiving unit the product may hit the guide such that it is forced to move to the corresponding inlet of the selected receiving unit. In its second position it provides a free passage for a discharged product to a next inlet which is located downstream of the downstream edge such that the guide does not form an obstruction for a product which leaves the conveyor already upstream of the next inlet in order to arrive at that inlet. In this case the discharged product can pass the guide in its second position without being obstructed.

It is also possible that the guide in its first position is located at the upstream edge of the inlet of the selected receiving unit such that a product which leaves the conveyor relatively quickly and/or moves from the conveyor towards the inlets in a direction perpendicular to the direction of conveyance relatively quickly may hit the guide such that it is forced to move to the corresponding inlet of the selected receiving unit rather than arriving at a location upstream of the upstream edge of the inlet of the selected receiving unit, for example in an adjacent inlet which lies upstream of the inlet of the selected receiving unit. In its second position the guide provides a free passage for a discharged product to a neighbouring inlet which is located upstream to the upstream edge such that the guide does not form an obstruction for a product which is intended to arrive at that inlet.

The displaceable guides provide the opportunity to temporarily lengthen a range within which discharged products can be caught and guided to a desired inlet. Consequently, the distance between the upstream edge and the downstream edge of each of the inlets can be minimized such that the inlets can be placed close to each other. This means that the number of inlets over a certain distance along the conveyor can be relatively high, hence advantageously using floor space efficiently.

Since the guide in its first position may form an obstruction for a discharged product to enter another inlet which is located adjacent to the at least one of the upstream edge and the downstream edge, the guide can be switched from the first position to the second position after a product has been delivered at a selected receiving unit. The discharging system may be configured such that when a product is destined to a selected receiving unit it will not discharge a product which is destined for the neighbouring receiving unit as long as the guide is still in the first position.

In the first position of the guide it may extend from the at least one of the upstream edge and the downstream edge of the inlet of the selected receiving unit in outward direction of the inlet of the selected receiving unit as seen in the direction of conveyance. For example, the guide may extend from the upstream edge in opposite direction of the direction of conveyance. This means that in fact the guide in its first position lengthens the inlet in the direction of conveyance.

In a particular embodiment the discharging system is adapted to selectively discharge products from the conveyor in transverse direction of the direction of conveyance, wherein the sorting device comprises a slide surface between the conveyor and the inlets, on which slide surface discharged products move from the conveyor to the inlets under operating conditions, wherein in the first positions the guides are located at the respective downstream edges and each of the guides forms an obstacle above the slide surface for guiding a moving discharged product on the slide surface to the inlet of the selected receiving unit and wherein in the second position each of the guides provides a free passage for a discharged product on the slide surface to another inlet which is located downstream of the downstream edge. A discharged product which leaves the conveyor rather late after starting the discharging action and/or which moves relatively slowly on the slide surface in transverse direction of the direction of conveyance may hit the guide which cooperates with the inlet of the selected receiving unit when the guide is in its first position such that the product is forced to move to the corresponding inlet of the selected receiving unit. After delivering the product to the selected receiving unit the guide may be switched to the second position such that a product which should arrive at a neighbouring inlet in the direction of conveyance is not obstructed by the guide when it already leaves the conveyor at a location upstream of the guide.

The guides may form extensions of the downstream edges in a direction towards the conveyor in their first positions. The guides may be aligned with the respective downstream edges in their first positions.

Each of the guides may be displaceable such that it projects above the slide surface in its first position and it is below or flush with the slide surface in its second position. This means that products can make efficient use of the slide surface at the guide when it is in its second position.

In a simple embodiment each of the guides is a plate which stands upright and extends in transverse direction with respect to the direction of conveyance in its first position.

The plate may be pivotable with respect to the slide surface, wherein the plate has a larger angle with respect to the slide surface in its first position than in its second position.

Alternatively, the guide may be liftable through an opening in the slide surface.

The plate may be flush with the slide surface in its second position. This provides the opportunity to create an almost continuous slide surface in the second position.

The discharging system may at least partly be provided at the conveyor. This means that at least a part of the discharging system travels together with the conveyor. It is possible that a part of the discharging system is static and triggers another part of the discharging system at the conveyor when a product must be discharged.

In a practical embodiment the conveyor comprises a plurality of carriers which are pivotally coupled to each other and follow a closed loop including curves in at least a horizontal direction. It is also possible that the carriers move in vertical direction.

In an alternative embodiment the conveyor and the discharging system are formed by a well-known sliding shoe sorter.

When the discharging system is provided at least partly at the conveyor it may comprise a discharging mechanism at each of the carriers.

There are different possibilities of discharging mechanisms, for example the carrier may comprise a tray for supporting a product, which tray is tiltable by the discharging mechanism for discharging a product from the tray, or the carrier may comprise a tiltable tray for supporting a product, which tiltable tray has a door at a lower end thereof which door can be opened by the discharging mechanism for discharging a product from the tray, or the carrier may comprise a tray for supporting a product and the discharging mechanism comprises a pushing element for pushing the product from the tray, or the carrier may comprise a cross-belt for supporting a product, which cross-belt is drivable by the discharging mechanism, or the carrier comprises a tiltable tray having a closed position for supporting a product and an open position for discharging a product, which tray is pivotable by the discharging mechanism about a pivot axis which extends transversely to the direction of conveyance such as in a so-called bombay sorter. The discharging mechanism may be activated at fixed locations in the direction of conveyance, which fixed locations correspond to the inlets of the respective receiving units. For example, the discharging system may comprise controllable guides which are mounted to a frame on which the carriers run, whereas each of the carriers comprises an engaging element which cooperates with the controllable guides when it engages one of the controllable guides in order to selectively activate the discharging mechanism.

The slide surface may be inclined downwardly in a direction from the conveyor to the inlets in order to force the products downwardly after leaving the conveyor. The products may be accelerated in transverse direction of the direction of conveyance, resulting in following a curved path on the slide surface.

In an alternative embodiment the guides are located at the respective upstream edges in their first positions and the inlets of the receiving units are located below the conveyor. In this case the products fall freely from the conveyor. A product which is destined for a selected receiving unit and which leaves the conveyor relatively early after starting a discharging action may hit the guide which is suitable for guiding the product to the inlet of the selected receiving unit in its first position.

The guide may in its first position be located such that it at least partly obstructs the neighbouring inlet that is located upstream of the upstream edge and which in its second position provides a free passage for a discharged product to the neighbouring inlet that is located upstream of the upstream edge. In this case, in its first position the guide may extend from the upstream edge in a direction opposite to the direction of conveyance, which means that in fact the inlets can be temporarily lengthened at their upstream edges. The guide may be a swing member or a swing plate which extends from the upstream edge in a direction opposite to the direction of conveyance in its first position and extends vertically from the upstream edge in its second position.

The conveyor may comprise a series of carriers, wherein each carrier is provided with a tiltable tray having a closed position for supporting a product and an open position for discharging a product, which tray is pivotable about a pivot axis which extends transversely to the direction of conveyance, for example a so-called bombay sorter conveyor.

Preferably, the upstream edge and the downstream edge of adjacent inlets coincide, since this also leads to efficient use of space.

In practice the receiving units may comprise respective chutes.

The invention will hereafter be elucidated with reference to the schematic drawings showing embodiments of the invention by way of example.

Figure 1:
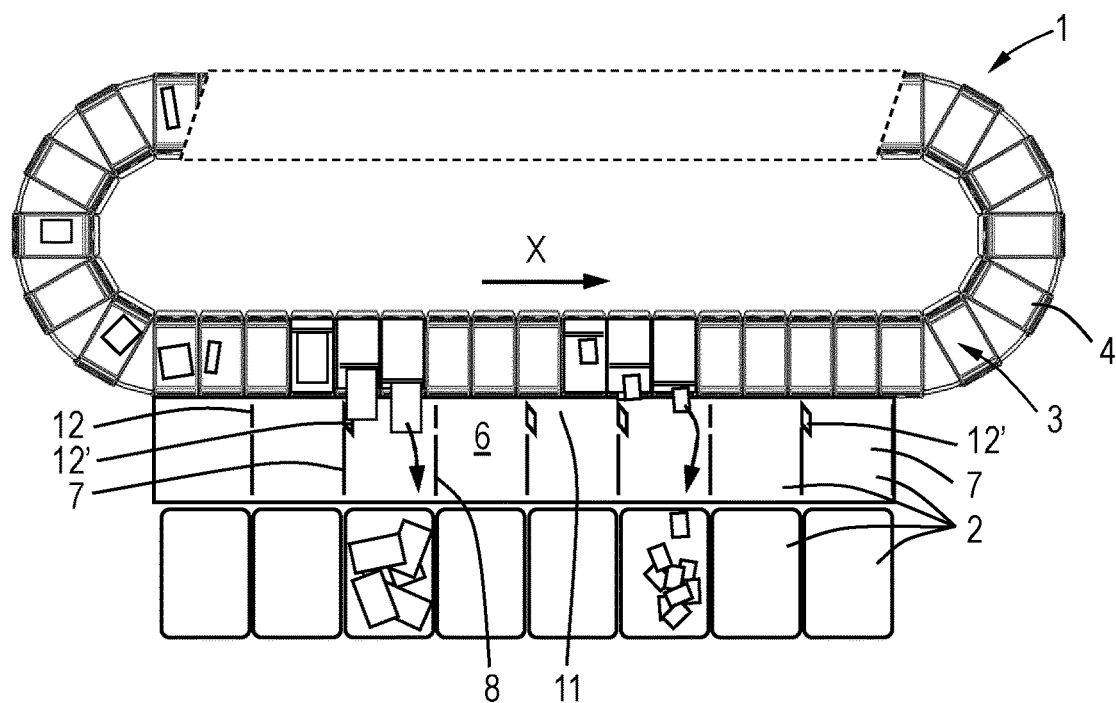
FIG. 1 is a plan view of an embodiment of a sorting device according to the invention.

FIG. 1 shows an embodiment of a sorting device 1 according to the invention as seen from above and FIGS. 2-8 show detailed parts thereof. The sorting device 1 is provided with receiving units 2 and is suitable for sorting products per destination and distributing them over the receiving units 2 for the various destinations in a controlled manner. The sorting device 1 comprises a conveyor 3 which is suitable for supporting and transporting products in a direction of conveyance X. The conveyor 3 comprises a plurality of separate carriers 4 which run on a frame 5. The carriers 4 are interconnected through pivoting links, hence forming an endless train of carriers 4 which run along a closed track under operating conditions. The closed track includes bends in a horizontal direction. As can be seen in FIG. 1, the carriers 4 spread apart in the bends and draw closer together again after the bends in the straight parts of the track.

The sorting device 1 is provided with a drive means (not shown) for driving the train of carriers 4. The drive means may comprise drivable rollers located along the track and which engage and drive one or more passing carriers 4 through friction between the rollers and the carrier(s) 4, but numerous alternative means for driving the carriers 4 behind each other are conceivable. For example, the carriers 4 may be coupled to each other through a drivable belt or chain. Each carrier 4 is able to receive a product and discharge it selectively at an intended location.

The sorting device 1 may comprise one or more loading stations (not shown) where products to be sorted are placed, optionally manually, on the carriers 4. The receiving units 2 comprise respective chutes and boxes in which discharged products arrive. The boxes may also be replaced by another type of containers, such as bags or the like. Each of the receiving units 2 has an inlet 6 for receiving discharged products from the carriers 4. The inlets 6 are arranged behind each other along the track and each of the inlets 6 has an upstream edge 7 and a downstream edge 8 which lies at a distance from the upstream edge 7 in the direction of conveyance X. In the embodiment as shown the upstream edge 7 and the downstream edge 8 of adjacent inlets 6 coincide and form respective upright walls between the adjacent inlets 6.

Figure 2:
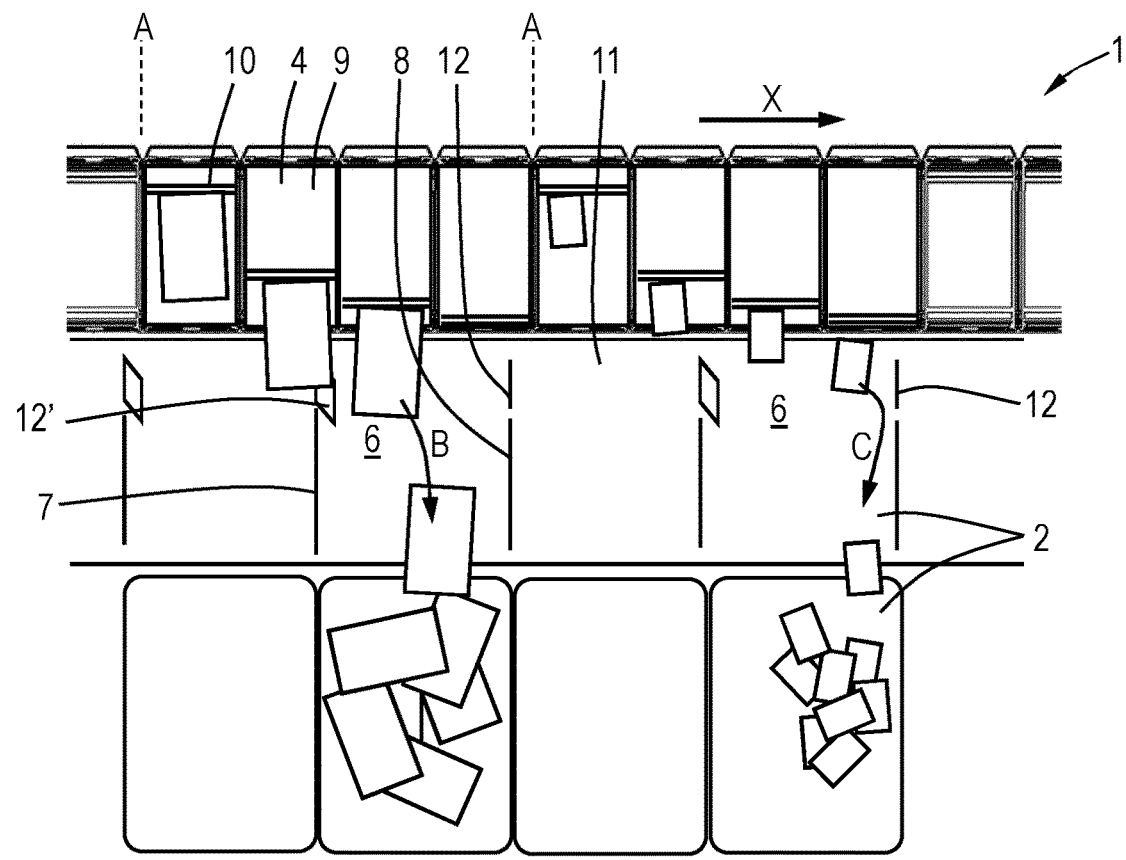
FIG. 2 is a similar view as FIG. 1, showing a part of the sorting device on a larger scale.
Figure 3:
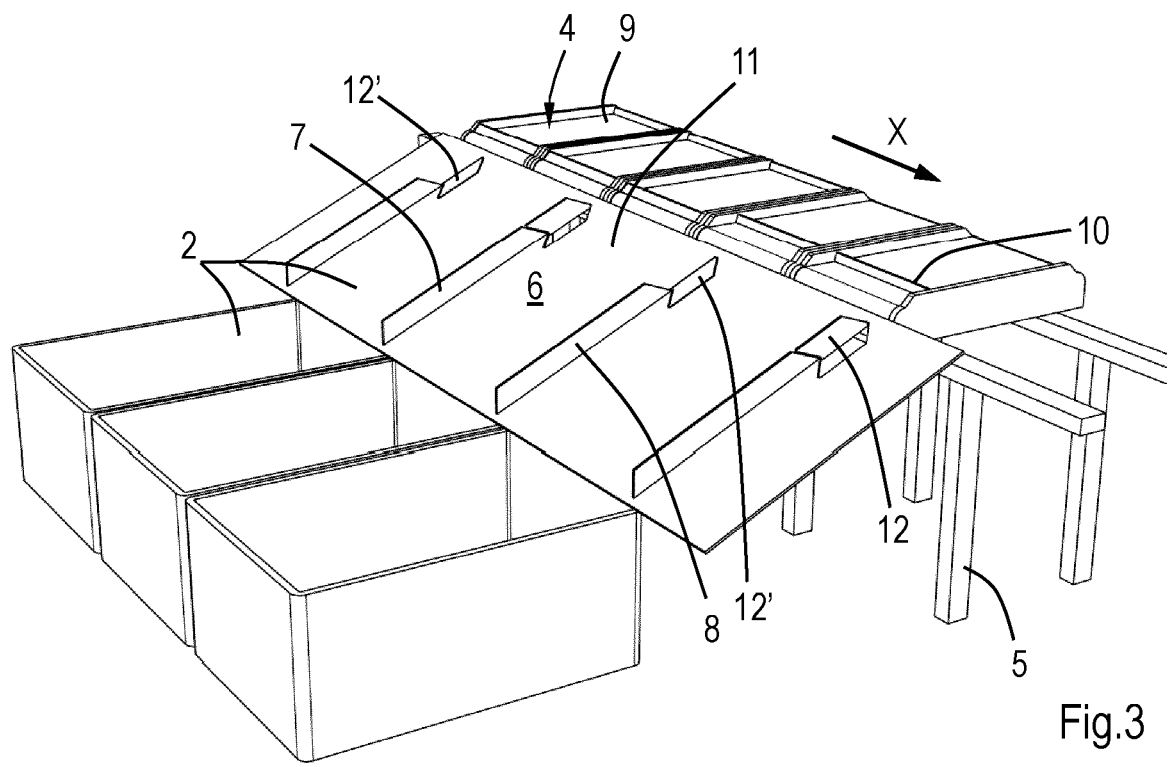
FIG. 3 is a perspective view of a part of FIG. 2.
Figure 4:
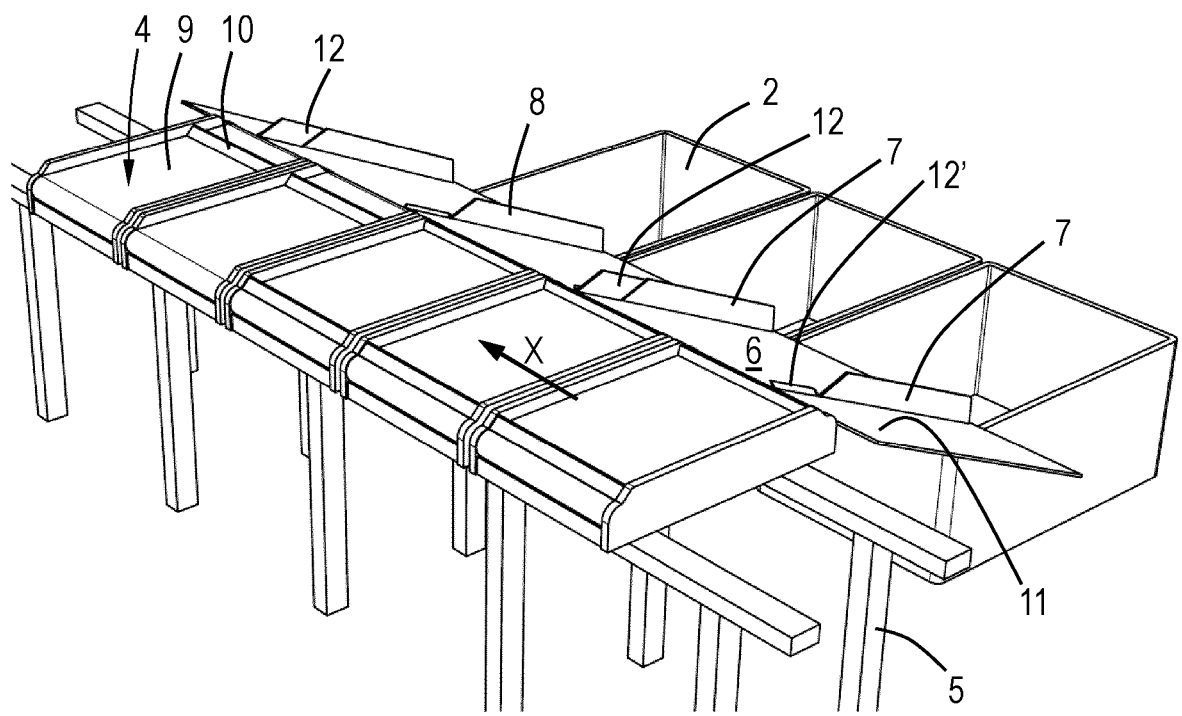
FIG. 4 is a similar view as FIG. 3 but seen from a different side.

Each of the carriers 4 comprises a tray 9 for supporting a product and a discharging mechanism in the form of a pushing element 10 for pushing a product from the tray 9. The pushing elements 10 are part of a discharging system for selectively discharging products at predefined locations along the track in the direction of conveyance X from the carriers 4 in transverse direction of the direction of conveyance X. The pushing elements 10 can be activated at predefined locations along the track which correspond to the respective receiving units 2. Two of these locations are illustrated by letter A in FIG. 2. At these locations A the pushing element 10 of a carrier 4 starts moving. The discharging system may further comprise a guiding system which is mounted to the frame 5 below the train of carriers 4, which guiding system can selectively activate and guide the pushing element 10 of a carrier 4 when it passes one of the locations A, i.e. when the carrier 4 approaches the inlet 6 of the desired receiving unit 2, where the product on the carrier 4 must be discharged. FIG. 2 shows that the locations A are located upstream of the upstream edges 7 of the corresponding inlets 6 where the products should arrive.

It is noted that in an alternative conveyor the start of a discharging action and the speed of removing an article from the carrier may be variable.

The sorting device 1 is also provided with a slide surface 11, which is located between the conveyor 3 and the inlets 6. The slide surface 11 is inclined downwardly in a direction from the conveyor 3 to the inlets 6. In this case the slide surface 11 is an upper surface of a flat plate, which flat plate is also located at the chutes of the receiving units 2.

When under operating conditions a product leaves one of the carriers 4 it slides downwardly on the slide surface 11 towards the inlet 6 of the selected receiving unit 2. Due to the velocity of the carriers 4 in the direction of conveyance X and the velocity of the product on the tray 9 in transverse direction, caused by the pushing element 10 and the inclined slide surface 11, the product may follow a curved path on the slide surface 11. A product leaving the carrier 4 relatively soon after activating the pushing element 10 and/or having a high speed in transverse direction of the direction of conveyance X may enter the inlet 6 of the selected receiving unit 2 just beyond the upstream edge 7 of the inlet 6 as seen in the direction of conveyance X. A product which leaves the carrier 4 relatively late after activating the pushing element 10 and/or having a low speed in transverse direction of the direction of conveyance X may tend to pass the downstream edge 8 of the inlet 6 of the selected receiving unit 2 as seen in the direction of conveyance X.

The latter condition is avoided by displaceable guides in the form of pivotable plates 12, 12' at the slide surface 11 which cooperate with the discharging system and the respective downstream edges 8 of the inlets 6. Each plate has a first position which is indicated by reference number 12 and a second position which is indicated by reference number 12'. In the first position the plate 12 stands upright and extends in transverse direction with respect to the direction of conveyance X and forms an obstacle above the slide surface 11 at the downstream edge 8 of the inlet 6 of the selected receiving unit 2 so as to force a moving discharged product on the slide surface 11 to the selected inlet 6. In the second position the plate 12' provides a free passage for a discharged product on the slide surface 11. In the latter condition the plate 12' is flush with the slide surface 11.

FIGS. 1 and 2 illustrate the functioning of the sorting device 1. Each of the figures shows successive travelling steps of the conveyor 3 in a single drawing. The figures illustrate two different situations at two different receiving units 2. In both situations the pushing element 10 of the carrier 4 is activated at the same location A upstream of the respective upstream edges 7 of the inlets 6 corresponding to the selected receiving units 2 where the discharged products should arrive. In the left situation in FIG. 2 the product leaves the carrier 4 earlier and moves faster towards the destined inlet 6 than in the right situation. The left situation is indicated by imaginary path B of the product and the right situation is indicated by imaginary path C of the product. Since products that follow the imaginary path C also arrive in the intended receiving unit 2, the length of the inlet 6 in the direction of conveyance X can be relatively short. It is noted that the left situation in FIG. 2 shows products of similar sizes and shapes and the right situation shows products of similar sizes and shapes, but in practice it may be a mixture of all kinds of products.

Figure 6:
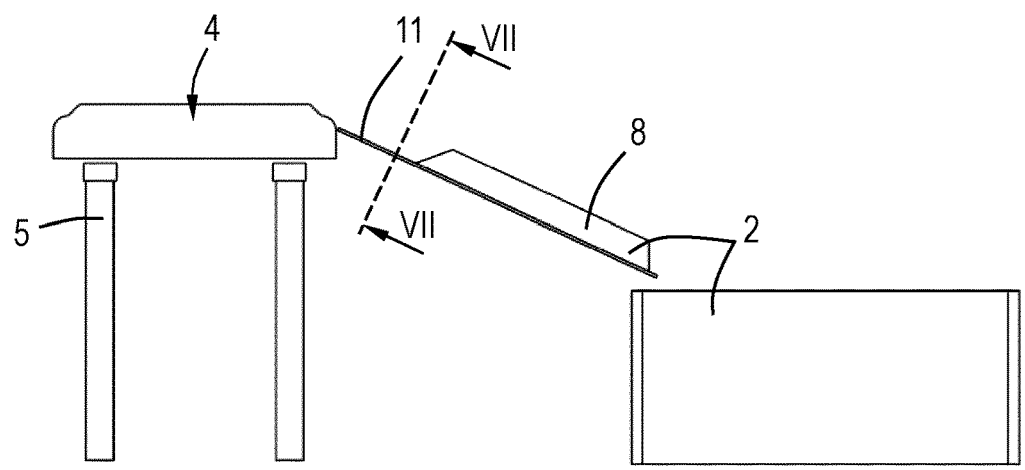
FIG. 6 is a similar view as FIG. 5, illustrating the guide in a second position.
Figure 7:
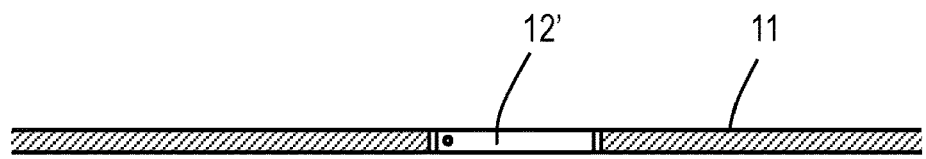
FIG. 7 is a sectional view along the line VII-VII in FIG. 6 on a larger scale.

The plates 12' which are located at the upstream edges 7 of the respective destined inlets 6 are flush with the slide surface 11 in their second positions such that the products can pass these plates 12' without obstruction in both situations. This allows the discharging system to discharge a product from the conveyor already before arriving at the inlet 6 of the selected receiving unit 2. The second position of the plates 12' is illustrated in FIGS. 6 and 7, for example.

Figure 5:
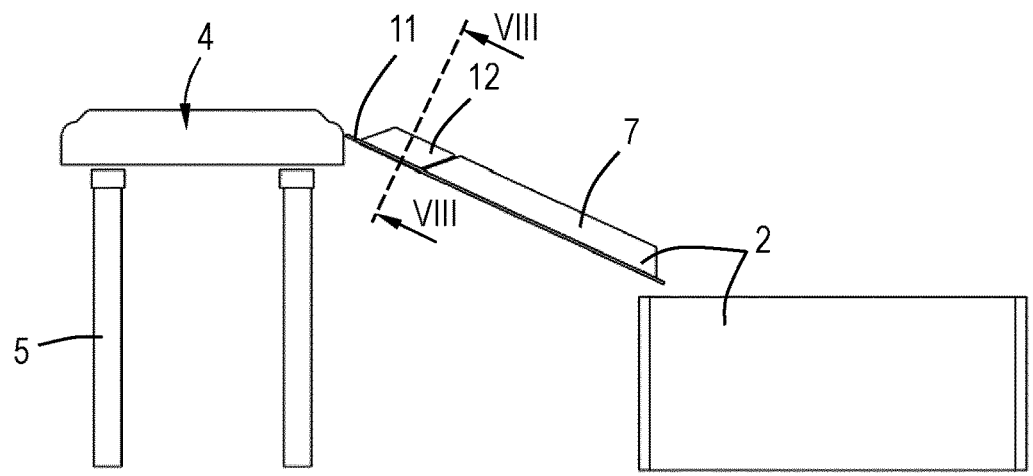
FIG. 5 is a cross-sectional view of the part as shown in FIG. 4, illustrating a guide in a first position.
Figure 8:
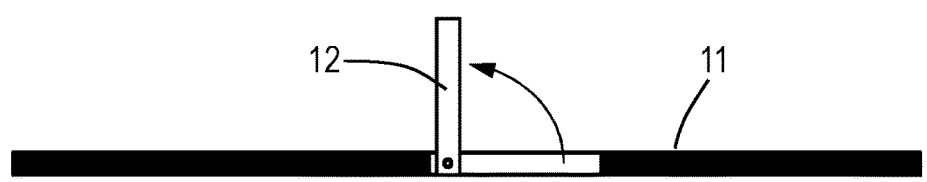
FIG. 8 is a sectional view along the line VIII-VIII in FIG. 5.

The plate 12 which is located at the downstream edge 8 of the destined inlet 6 stands upright and forms an obstacle to the approaching product and forces the product to enter the destined inlet 6. This first position of the plates 12 is illustrated in FIGS. 5 and 8, for example. After guiding the product to the destined inlet 6 the plate 12 can be returned to its second position. FIGS. 1-4 show that in the first position the plate 12 is aligned with the corresponding downstream edge 8, and in this case also with upstream edge 7 since the upstream edge 7 and the downstream edge 8 of two adjacent inlets 6 coincide.

When the plate 12 at the downstream edge 8 of the inlet 6 of a selected receiving unit 2 is in the first position, the discharging system will avoid that a product which is intended for a neighbouring inlet 6 in the direction of conveyance X will be discharged.

The discharging system may be adapted such that under operating conditions the movement of the plate 12, 12' from the second to the first position is synchronized with the start of moving the pushing element 10 of the carrier 4 which supports the product to be delivered at the inlet 6 at which downstream edge 8 the plate 12, 12' is located. Similarly the discharging system may be adapted such that under operating conditions the movement of the plate 12, 12' from the first to the second position is synchronized with the start of moving the pushing element 10 of the carrier 4 from which the product has been delivered at the inlet 6 at which downstream edge 8 the plate 12, 12' is located back to its initial position, but the movement of the plate 12, 12' from the first to the second position may be faster, for example directly after detecting that the product has entered the inlet 6 of the selected receiving unit.

In alternative embodiments each of the carriers may comprise a tray which is tiltable about an axis which extends in the direction of conveyance by the discharging mechanism for discharging a product from the tray, or each of the carriers may comprise a cross-belt for supporting a product, which cross-belt is drivable by the discharging mechanism. In these embodiments the location of a product in transverse direction of the direction of conveyance X may have a greater effect on the location along the track where the product leaves the carrier after starting a discharging action at the same location along the track of the conveyor.

Figure 9:
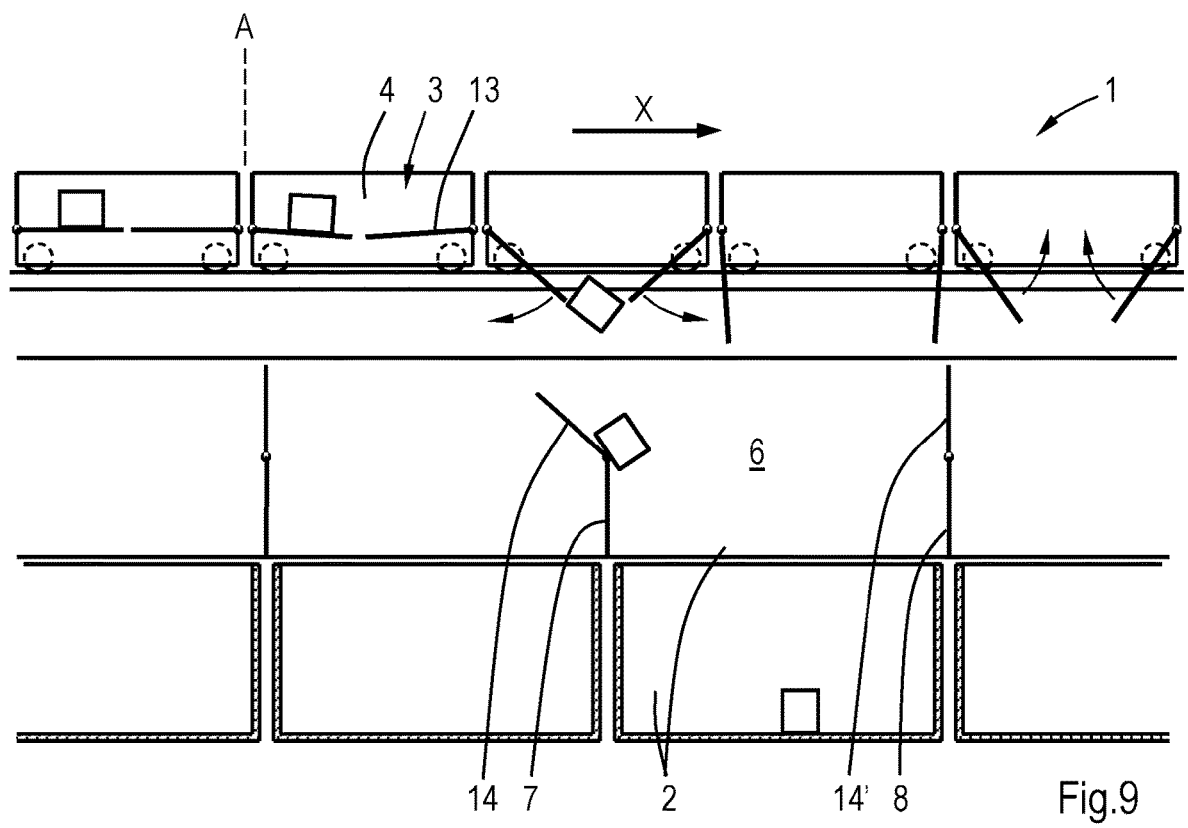
FIG. 9 is a side view of an alternative embodiment of a sorting device according to the invention.
Figure 10:
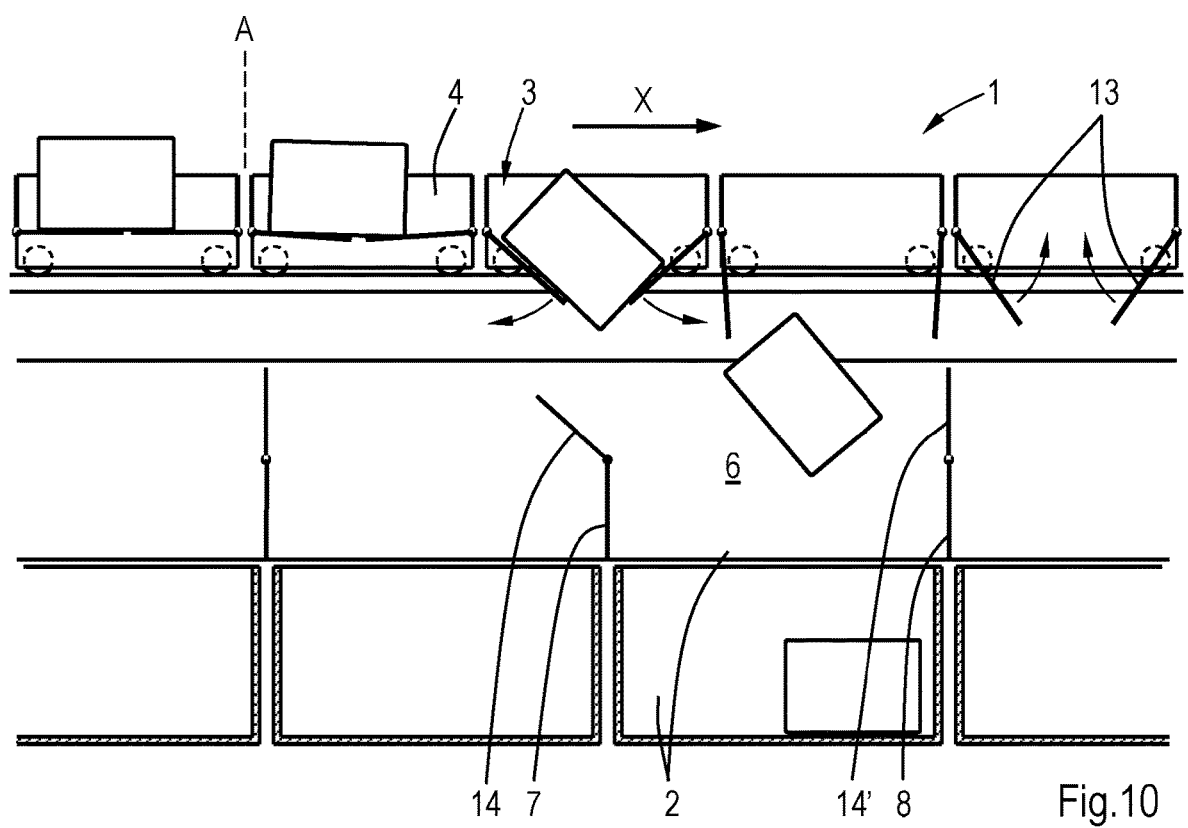
FIG. 10 is a similar view as FIG. 9, but illustrating a different situation.

FIGS. 9 and 10 show an alternative embodiment of the sorting device according to the invention. Parts which correspond to parts in the embodiment as shown in FIG. 1-8 have the same reference numbers. Each of the figures shows successive travelling steps of the conveyor 3 in a single drawing. In this case the carriers 4 of the conveyor 3 also form an endless train which run along a closed track under operating conditions. Each of the carriers 4 has tiltable trays 13 which are pivotable about respective pivot axes which extend transversely to the direction of conveyance X. When the trays 13 are in a closed positions they form a supporting surface for supporting a product. When the trays 13 are opened a product being on the trays 13 will be discharged. The discharging system may comprise a guiding system which can selectively open and close the trays 13 of a carrier 4 when it passes one of the locations A, i.e. when the carrier 4 approaches the inlet 6 of the selected receiving unit 2, where the product on the carrier 4 should arrive. Such a conveyor is typically applied in well-known bombay sorters.

The receiving units 2 comprise respective inlets 6 for receiving discharged products from the conveyor 3. In this case the inlets 6 are arranged below the conveyor 3 since the products fall freely downwardly after being dropped. The upstream edge 7 and the downstream edge 8 of two adjacent inlets 6 coincide. The embodiment as shown in FIGS. 9 and 10 has displaceable guides in the form of swing members 14, 14' which cooperate with the discharging system and the upstream edges 7 of the inlets 6 of the respective receiving units 2. The swing members 14, 14' are pivotable about axes which extend horizontally and perpendicularly to the direction of conveyance (X).

Each swing member has a first position which is indicated by 14 in FIGS. 9 and 10 and a second position which is indicated by 14' in FIGS. 9 and 10. In the first position the swing member 14 is located between the conveyor 3 and the inlet 6 of the selected receiving unit 2 at the upstream edge 7 such that it can guide a discharged product to the inlet 6 of a selected receiving unit 2. In the situations as shown in FIGS. 9 and 10 the swing member 14 in its first position is oriented such that it partly obstructs the next inlet 6 which is located adjacent to the upstream edge 7 of the inlet 6 of the selected receiving unit 2 to which the product is delivered. After a product has been delivered the swing member 14 can be returned to its second position 14' in which it provides a free passage for a discharged product to the next inlet 6 which is located adjacent to the upstream edge 7.

In FIGS. 9 and 10 the start of a discharging action is indicated at location A. FIG. 9 illustrates a situation in which a small product is discharged and FIG. 10 illustrates a situation in which a large product is discharged. It can be seen that the small product leaves the conveyor 3 earlier than the large product. Since the swing member 14, 14' is in the first position the small product is prevented from being delivered to the inlet 6 which is located upstream of the inlet 6 of the selected receiving unit 2.

The discharging system may be adapted such that under operating conditions the movement of the swing member 14, 14' from the second to the first position is synchronized with the start of opening the trays 13 of the carrier 4 which supports the product to be delivered at the inlet 6 at which upstream edge 7 the swing member 14, 14' is located. Similarly the discharging system may be adapted such that under operating conditions the movement of the swing member 14, 14' from the first to the second position is synchronized with the start of closing the trays 13 of the carrier 4 from which the product has been delivered at the inlet 6 at which upstream edge 7 the swing member 14, 14' is located.

From the foregoing, it will be clear that the invention provides the opportunity to have relatively short inlets in the direction of conveyance.

The invention is not limited to the embodiments shown in the drawings and described hereinbefore, which may be varied in different manners within the scope of the claims and the technical equivalents.

The invention claimed is:
1. A sorting device, comprising
   a conveyor for supporting and transporting products in a direction of conveyance, a discharging system for selectively discharging products from the conveyor at predefined locations in the direction of conveyance, and a plurality of receiving units including respective inlets for receiving discharged products from the conveyor, which inlets are arranged behind each other parallel to the conveyor at a distance from the conveyor and each of the inlets has an upstream edge and a downstream edge which lies at a distance from the upstream edge in the direction of conveyance, wherein the sorting device is provided with displaceable guides which cooperate with the discharging system and at least one of the upstream edges and the downstream edges of the inlets of the respective receiving units, and each guide has a first position for guiding a discharged product to the inlet of a selected receiving unit in which said first position it is located between the conveyor and the inlet of the selected receiving unit at said at least one of the upstream edge and the downstream edge thereof, and a second position for providing a free passage for a discharged product to another inlet which is located adjacent to said at least one of the upstream edge and the downstream edge.

2. The sorting device according to claim 1, wherein the guide in its first position extends from the at least one of the upstream edge and the downstream edge of the inlet of the selected receiving unit in outward direction of the inlet of the selected receiving unit as seen in the direction of conveyance.

3. The sorting device according to claim 2, wherein the discharging system is adapted to selectively discharge products from the conveyor in transverse direction of the direction of conveyance, the sorting device comprises a slide surface between the conveyor and the inlets, on which slide surface discharged products move from the conveyor to the inlets under operating conditions, in the first positions the guides are located at the respective downstream edges and each of the guides forms an obstacle above the slide surface for guiding a moving discharged product on the slide surface to the inlet of the selected receiving unit and in the second position each of the guides provides a free passage for a discharged product on the slide surface to another inlet which is located downstream of the downstream edge.

4. The sorting device according to claim 3, wherein the discharging system is at least partly provided at the conveyor.

5. The sorting device according to claim 1, wherein the discharging system is adapted to selectively discharge products from the conveyor in transverse direction of the direction of conveyance, the sorting device comprises a slide surface between the conveyor and the inlets, on which slide surface discharged products move from the conveyor to the inlets under operating conditions, in the first positions the guides are located at the respective downstream edges and each of the guides forms an obstacle above the slide surface for guiding a moving discharged product on the slide surface to the inlet of the selected receiving unit and in the second position each of the guides provides a free passage for a discharged product on the slide surface to another inlet which is located downstream of the downstream edge.

6. The sorting device according to claim 5, wherein each of the guides is displaceable such that it projects above the slide surface in its first position and it is below or flush with the slide surface in its second position.

7. The sorting device according to claim 6, wherein each of the guides is a plate which stands upright and extends in a transverse direction with respect to the direction of conveyance in its first position.

8. The sorting device according to claim 5, wherein each of the guides is a plate which stands upright and extends in a transverse direction with respect to the direction of conveyance in its first position.

9. The sorting device according to claim 8, wherein the plate is pivotable with respect to the slide surface, and the plate has a larger angle with respect to the slide surface in its first position than in its second position.

10. The sorting device according to claim 9, wherein the plate is flush with the slide surface in its second position.

11. The sorting device according to claim 5, wherein the slide surface is inclined downwardly in a direction from the conveyor to the inlets.

12. The sorting device according to claim 1, wherein the discharging system is at least partly provided at the conveyor.

13. The sorting device according to claim 12, wherein the discharging system comprises a discharging mechanism at each of the carriers.

14. The sorting device according to claim 13, wherein the carrier comprises a tray for supporting a product, which tray is tiltable by the discharging mechanism for discharging a product from the tray, or the carrier comprises a tray for supporting a product and the discharging mechanism comprises a pushing element for pushing the product from the tray, or the carrier comprises a cross-belt for supporting a product, which cross-belt is drivable by the discharging mechanism, or the carrier comprises a tiltable tray having a closed position for supporting a product and an open position for discharging a product, which tray is pivotable by the discharging mechanism about a pivot axis which extends transversely to the direction of conveyance.

15. The sorting device according to claim 12, wherein the conveyor comprises a plurality of carriers which are pivotally coupled to each other and follow a closed loop including curves in at least a horizontal direction.

16. The sorting device according to claim 15, wherein the discharging system comprises a discharging mechanism at each of the carriers.

17. The sorting device according to claim 1, wherein the conveyor comprises a plurality of carriers which are pivotally coupled to each other and follow a closed loop including curves in at least a horizontal direction.

18. The sorting device according to claim 1, wherein in the first positions the guides are located at the respective upstream edges and the inlets of the receiving units are located below the conveyor, and the guide in its first position can be located such that it at least partly obstructs the neighbouring inlet that is located upstream of the upstream edge and which in its second position provides a free passage for a discharged product to the neighbouring inlet that is located upstream of the upstream edge.

19. The sorting device according to claim 18, wherein the conveyor comprises a series of carriers, and each carrier is provided with a tiltable tray having a closed position for supporting a product and an open position for discharging a product, which tray is pivotable about a pivot axis which extends transversely to the direction of conveyance.

20. The sorting device according to claim 1, wherein the upstream edge and the downstream edge of adjacent inlets coincide.

\* \* \* \* \*